…

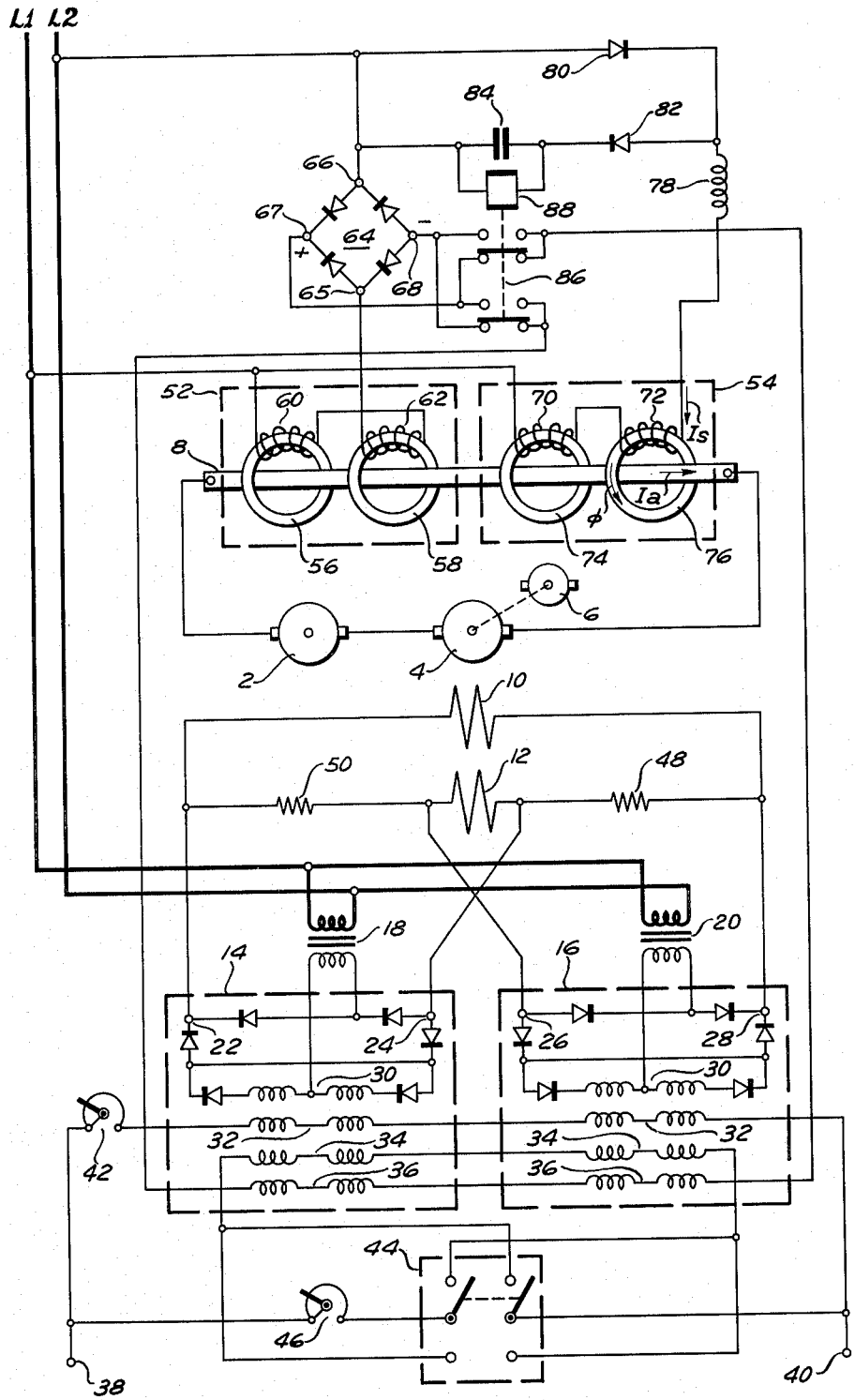

United States Patent Office 3,258,654
Patented June 28, 1966

3,258,654
ELECTRICAL CURRENT SENSING MEANS
Gene C. Lutsch, Hales Corners, and Carl J. Weiss, Milwaukee, Wis., assignors to Cutler-Hammer, Inc., Milwaukee, Wis., a corporation of Delaware
Filed Apr. 5, 1963, Ser. No. 270,853
1 Claim. (Cl. 317—148)

This invention relates to curent sensing devices and more particularly to such devices which are sensitive to the direction of direct current flow in an electrical conductor.

In the design of direct current motor controllers it is often desirable to furnish a current sensing device to measure the current flowing to the motor armature from the power source. Such an arrangement might, for instance, be made to provide a signal proportional to motor current for the purpose of current limit control for acceleration and deceleration. This is usually done with a signal resistor in series with the motor armature and power source. The voltage drop across the resistor is proportional to the motor current. This scheme has several undesirable features. For large motors the power losses in the resistor can be excessive. Also, when used in a closed loop position servo mechanism, such as Barney haul or beam stop, the presence of the resistor in the power loop adversely affects the accuracy of the system. In such a servo mechanism the accuracy of the stopping point is directly related to the amount of resistance in the power loop consisting of the power source and the driven motor. It would further be desirable to electrically isolate the current sensing circuit from the high vlotage often used to supply motor armature.

The foregoing undesirable features of the signal resistor can be overcome by using a transductor, a saturable reactor device which gives an output signal proportional to motor armature current. This is done without introducing a resistance into the power loop and the current sensing circuit is isolated from the armature circuit. However, the standard transductor has a serious disadvantage in that it is not polarity sensitive. It gives an output signal proportional to the magnitude of the armature current and the polarity of this signal is the same regardless of the direction of flow of the armature current.

In revising servo mechanisms in which the driven motor is reversed by reversal of the armature current, such as Barney haul or beam stop, it would be desirable to sense the direction of the motor armature current without increasing the power loop resistance over that low quantity permitted by use of the transducer current magnitude sensing device.

It is therefore an object of this invention to provide an electrical current sensing system sensitive to both magnitude and direction of direct current without introducing resistance into the circuit of the current being measured.

It is another object of the invention to provide a D.C. motor control system incorporating current limit control in which the current sensing means introduces no resistance into the motor power circuit and is electrically isolated therefrom.

It is a more specific object of this invention to provide a direct current measuring system which incorporates a saturable reactor device as the current sensitive element and which is able to detect the polarity of the current measured.

Various other objects and advantages of this invention will hereinafter appear.

While the device hereinafter described is adapted to fulfill the objects stated, it is to be understood that it is not intended that the invention be confined to the particular preferred embodiment disclosed since it is susceptible of various modifications without departing from the scope of the claim.

The single figure of the drawings is a schematic drawing showing a direct current motor controlling system incorporating the invention defined in the claim.

The drawing illustrates a motor armature current controller incorporating current limit and motor reversing control. An armature of a motor 2 is supplied with direct current from a generator 4 which is mechanically driven by a prime mover 6. A conductor 8, representative of a bus conductor such as used in a controller cabinet, is connected in series with the motor 2 and generator 4 in the power loop.

Generator 4 is supplied with dual field windings 10 and 12. The field supply circuit for windings 10 and 12 is of a push-pull type described in patent No. 2,841,756 issued July 1, 1958 to Eric Pell. This power supply comprises two opposing magnetic amplifiers 14 and 16 connected to supply direct current voltages of opposite polarities to field windings 10 and 12. The relative magnitudes of the amplifier output voltages determine the polarity of the resultant current applied to field windings 10 and 12 and consequently determine the polarity of the output of generator 4 and the direction of rotation of motor 2.

Amplifiers 14 and 16 are supplied, respectively, by transformers 18 and 20 which in turn are energized by the A.C. power lines L1 and L2. The D.C. outputs of amplifiers 14 and 16 are delivered at terminals 22 and 24 of amplifier 14 and 26 and 28 of amplifier 16. Each amplifier 14 and 16 has a power winding 30 and three control windings 32, 34 and 36. Windings 32 are the bias windings and are connected in series and supplied with biasing direct current from D.C. power terminals 38 and 40. A rheostat 42 connected in series with bias windings 32 is used to adjust the level of bias for the amplifiers 14 and 16. Windings 34 are the motor speed and direction control windings which are supplied with direct current through a reversing switch 44 and a speed setting rheostat 46. Switch 44 controls the polarity of the current supplied to windings 34 and consequently the polarity of the field current supplied to windings 10 and 12. Adjustment of rheostat 46 controls the magnitude of current to control windings 34 and consequently controls the magnitude of the field current to windings 10 and 12.

The output of amplifier 14 is applied to field winding 10 through the path comprising terminal 22, field winding 10, resistor 48 and terminal 24. This same voltage is applied to field winding 12 through the path comprising terminal 22, resistor 50, field winding 12 and terminal 24. Similarly, the output of amplifier 16 from terminals 26 and 28 is applied to field winding 10 through resistor 50 and to field winding 12 through resistor 48.

With the exception of current limit windings 36, the field current supply as heretofore described is the same as that more completely described in the aforementioned Patent No. 2,841,756. Windings 36, which act differentially with respect to windings 34, have been added to provide current limit control to the system. In order to accomplish these results, this current limit signal to windings 36 must be reversible and of proper polarity with respect to the speed and direction signal applied to windings 34.

The energization of windings 36 is performed by a current limit control system which is sensitive to armature current limit in conductor 8. The current detection is accomplished by two saturable core devices, a current magnitude sensitive device 52 is commonly referred to as a transductor and may be of the type manufactured by Magnetics, Inc., Butler Penn., under Type Number TD4326. This transductor 52 has two similar toroidal saturable magnetic cores 56 and 58 which encircle conductor 8. The respective windings 60 and 62 on cores 56 and 58 are of similar size and number of turns and are connected in series in a manner whereby current flow in windings 60 is in a rotary direction opposite to that of current flow in winding 62. During operation of the system, alternating current from A.C. power lines L1 and L2 is impressed across windings 60 and 62, and transductor 52 characteristically exhibits an impedance inversely proportional to the magnitude of the direct current flowing in conductor 8. Coils 60 and 62 may be referred to as the load windings of reactor 52 and conductor 8 serves the purpose of a control winding.

As preferably illustrated, conductor 8 with respect to reactor 52 is a winding of the type referred to as straight-through. The impedance of transductor 52 is the same regardless of the polarity of the current flowing in conductor 8. Since the magnitude of alternating current flow through windings 60 and 62 is approximately inversely proportional to impedance of transductor 52, such alternating current flow is proportional to the direct current flow in conductor 8 and is a useful indicator thereof. In practice, this alternating current is rectified to a D.C. signal current by full wave bridge rectifier 64 having A.C. input terminals 65 and 66 and D.C. output terminals 67 and 68. This D.C. signal current being proportional to the D.C. armature current flowing to motor 2 is usable as a current limit signal to windings 36 when this output of bridge 64 is of a direction to oppose the effect of current flow in control windings 34.

The current direction sensitive reactor 54 is a modification of a transductor similar to the current magnitude sensitive transductor 52. The modification is accomplished by reconnecting the leads to coils 70 and 72 on cores 74 and 76 respectively so that the current flow in each of coils 70 and 72 is in the same rotary direction. In terminology commonly used with reference to saturable reactors, windings 70 and 72 are the load windings and conductor 8 functions as a straight through control winding. It should be noted that the function of saturable reactor 54 could be accomplished with a device with a single saturable core and a single coil and that the use of two coils 70 and 72 in series is a matter of choice.

The complete current direction sensing circuit consists of saturable reactor 54, reactor 78, diodes 80 and 82, capacitor 84, and an electroresponsive device consisting of a two pole double throw reversing relay 86 driven by its operating coil 88. Relay 86 is biased to the position shown and may be adjusted to respond to various levels of energizing current. The A.C. power is supplied from main conductors L1 and L2. During that half cycle in which conductor L2 is positive, a conductive circuit exists from conductors L2 through diode 80, inductor 78, coil 72, coil 70 in series to conductor L1. During the opposite half cycle current will flow from conductor L1 through coil 70, coil 72, inductor 78, diode 82, coil 88 in series to conductor L2. Capacitor 84 is shunted across coil 88 to prevent chatter of relay 86.

The operation of the current direction sensing circuit will now be described.

The transductor 52, by itself, functions in a conventional manner. The A.C. voltage of lines L1 and L2 is impressed across serially connected windings 60 and 62 and the rectifying bridge 64. The impedance of transductor 52 varies inversely as the magnitude of D.C. current carried by bus bar 8. Consequently, the A.C. current input to bridge 64 and the D.C. output at terminals 67 and 68 varies directly as the magnitude of current on bus bar 8. This output of bridge 64 is therefore a useful indication of the magnitude of the armature current to motor 2, but is of constant polarity, being positive at terminal 67 and negative at terminal 68, and does not give an indication of the polarity of such armature current.

The direction of current flow in bus bar 8 is detected by the circuit including saturable reactor 54. It may be assumed that when motor 2 is being powered in the forward direction the normal armature current $I_a$ flows through bus bar 8 in the direction indicated by the arrow labeled $I_a$. A current of this direction produces a flux in core 76 in the direction indicated by the arrow labeled $\phi$. Flux of this direction is also produced by winding 72 when the current $I_s$ flowing therein is of the direction indicated by the arrow labeled $I_s$. Core 76, bus bar 8 and winding 72 are so arranged and constructed that core 76 tends to become saturated when the fluxes produced by significant magnitudes of currents in bus bar 8 and winding 72 are additive. It does not saturate when currents in bus bar 8 and winding 72 oppose each other and consequently produce lesser quantities of flux therein. When the armature current $I_a$ in bus bar 8 is very small, the flux produced thereby may be of an insignificant magnitude and the core 76 may not saturate even if the fluxes produced by core 8 and winding 72 are additive. This failure to saturate and resultant failure to detect the direction of such insignificant armature current is unimportant particularly where, as in the system illustrated, the signal obtained is used for the purpose of current limit control. The serially connected other half of reactor 54, consisting of core 74 and winding 70, functions in a similar manner and it should be understood that the detailed description of the operation of core 76 applies similarly to core 74.

The inductor 78 is connected in series with reactor windings 70 and 72 to limit the voltage applied the windings to a safe value.

First assume that the armature current $I_a$ is flowing through conductor 8 in the direction shown. During that half cycle in which line L2 is positive, the A.C. signal current $I_s$ flows through the branch containing diode 80, through inductor 78 and through reactor load windings 72 and 70 in the direction shown. Both the armature current $I_a$ and the signal current $I_s$ tend to produce flux $\phi$ in the direction illustrated, and if the armature current $I_a$ is of a signficant magnitude, core 76 saturates. This saturation results in a decrease in impedance through reactor 54 and the signal current $I_s$ increases. The reversing relay 86 is insensitive to this increase because its coil 88 is in series with diode 82 which blocks current flow during this half cycle. During the opposite half cycle when line L2 is negative, the signal current $I_s$ flows through windings 70 and 72 in the direction opposite to that illustrated and thence through inductor 78, diode 82 and coil 88 to line L2. Since the signal current $I_s$ opposes the armature current $I_a$ during this half cycle, core 76 does not saturate and the impedance of reactor 54 remains relatively high. The signal current $I_s$ consequently remains at a level too low to energize relay 86. It can be seen therefore that, while the armature current $I_a$ flows in the direction shown, the reversing relay 88 will not be energized and remains in the position shown. Any current signal output from bridge 64 therefore flows from right to left through control winding 36 of the field supply.

Next assume that the direction of the armature current $I_a$ is reversed to flow in a direction opposite to that shown. During that half cycle in which line L2 is positive, the signal current $I_s$ flows through diode 80, inductor 78 and windings 72 and 70 in the direction shown. The signal current $I_s$ opposes the armature current $I_a$ and core 76 does not saturate and the signal current $I_s$ remains at a low level. Furthermore, diode 82 again blocks the signal current $I_a$ from coil 88 during this half cycle. During the opposite half cycle of signal current $I_a$ when line L2 is negative, the signal current $I_s$ flows oppositely to the direction shown through windings 70 and 72. Both the armature current $I_a$ and signal current $I_s$ then produce flux in core 76 in a direction opposite to that shown and core 76 saturates. The consequent decrease in impedance causes an increased signal current to flow through inductor 78, diode 82 and coil 88. This increased signal current causes relay 86 to be energized to move both of its contacts upwardly to reverse the polarity of armature current signal applied to winding 36 from terminals 67 and 68 of bridge 64. Capacitor 84 is connected across coil 88 to sustain current flow therethrough during those half cycles in which diode 82 blocks current $I_s$ and capacitor 84 thereby prevents chattering of the relay 86. It can be seen therefore that, when a significant magnitude of armature current $I_a$ flows through conductor 8 in a direction opposite to that shown, armature current signal from bridge 64 will flow through control winding 36 in a left to right direction.

An explanation will now be made of the mode of operation of the aforedescribed current sensing devices within a reversing motor control system with current limit control.

Assume that motor 2 is running at a steady speed in the forward direction and the armature current $I_a$ is flowing through conductor 8 in the direction shown. Assume further that forward rotation of motor 2 is accomplished by providing a speed signal to control winding 36 of the field supply of such polarity that the signal current flows therethrough from right to left and that an increase in such signal current will increase the output of generator 4. A current limit signal flowing from right to left through control windings 36 acts in opposition to the speed signal current of windings 34, and therefore any increase in such current limit signal current will tend to reduce the output of generator 4.

If motor armature voltage $I_a$ is caused to be increased by clockwise rotation of speed setting rheostat 46, motor 2 will tend to accelerate. If such increase is too rapid or if motor 2 fails to accelerate quickly enough, the armature current $I_a$ may rise to excessive magnitudes and a current limit signal will flow through signal winding 36 in a right to left direction to reduce the voltage output of generator 4 until the armature current reduces to a safe value.

Counterclockwise rotation of speed setting rheostat 46 will cause the output of generator 4 to be reduced. If such reduction takes place quickly and motor 2 is rotating rapidly with sufficient inertia, the induced counter voltage may be very large and the armature current $I_a$ may rise to excessively high values. The armature current $I_a$ will, under these circumstances, be in a direction opposite to that shown. Consequently, relay 86 will be energized and the current limit signal will flow through control winding 36 from left to right. This signal will cause the output of generator 4 to rise in opposition to the excessive counter voltage and the armature current will consequently be reduced to a safe value.

Consideration will next be given to the situation where motor 2 is running in a forward direction and the output of generator 4 is reversed to cause motor 2 to be stopped by plugging or to reverse the direction of rotation of motor 2. Switch 44 is thrown to reverse the flow of current in signal winding 34 which causes the voltage generated by generator 4 to reverse. The armature current $I_a$ may, under these circumstances, rise to dangerously high levels. Since the direction of flow of the armature current $I_a$ reverses upon plugging to a direction opposite to that shown, relay 86 is energized and flow of current, limit signal current, through control winding 36 reverses. Consequently, a large signal current through winding 36 opposes the effect of windings 34 and will tend to reduce or possibly reverse the output of generator 4 and keep the armature current $I_a$ within reasonable limits.

It can be seen that the invention need not be confined to use in motor control but may be used in any application where current direction is to be sensed. It is of particular benefit where electrical isolation of the sensing circuit is desirable or where introduction of resistance into the circuit of the current sensed is unwanted.

We claim:

A current direction sensitive device comprising:
a reactor comprising a saturable core, a control winding, and a load winding, each of said windings being capable of producing flux in said core of directions dependent upon the direction of flux of current in said winding;
said reactor being capable of saturation when flux produced by said control winding is additive to that produced by said load winding and further being normally incapable of saturation when flux produced by said control winding opposes that produced by said load winding;
a source of A.C. connected to said load winding through two parallel connected legs, each of said legs having unidirectional conducting means polarized so that current flows through said legs alternately on opposite half cycles of said A.C.; and
electroresponsive means connected in one of said legs sensitive to the magnitude of current therein and thereby responsive to changes in impedance of said load winding due to saturation of said reactor during half cycles of said A.C. of one polarity;
whereby said electroresponsive means responds when current flow in said control winding is of such direction as to produce flux additive to that flux produced by said load winding to thereby indicate the direction of current flow in said control winding.

References Cited by the Examiner

UNITED STATES PATENTS

| | | | |
|---|---|---|---|
| 2,247,983 | 7/1941 | Barth | 317—148 X |
| 2,773,229 | 12/1956 | Hunt et al. | 318—144 |
| 2,892,974 | 6/1959 | Moore | 317—148 |
| 2,937,321 | 5/1960 | Decker | 317—148 |
| 2,988,689 | 6/1961 | Jackson | 323—56 |
| 3,135,911 | 6/1964 | Van Allen | 323—89 |

STEPHEN W. CAPELLI, *Primary Examiner.*

ORIS L. RADER, SAMUEL BERNSTEIN, *Examiners.*

S. GORDON, D. YUSKO, *Assistant Examiners.*